Oct. 31, 1967   J. H. TURNBULL ET AL   3,349,651
TOOL FOR PIERCING AND THREADING A WORKPIECE
Filed Sept. 20, 1965   3 Sheets-Sheet 1

INVENTORS.
JOHN HILTON TURNBULL
ALEXANDER BASIL WATT
BY Kurt Kelman
Agent

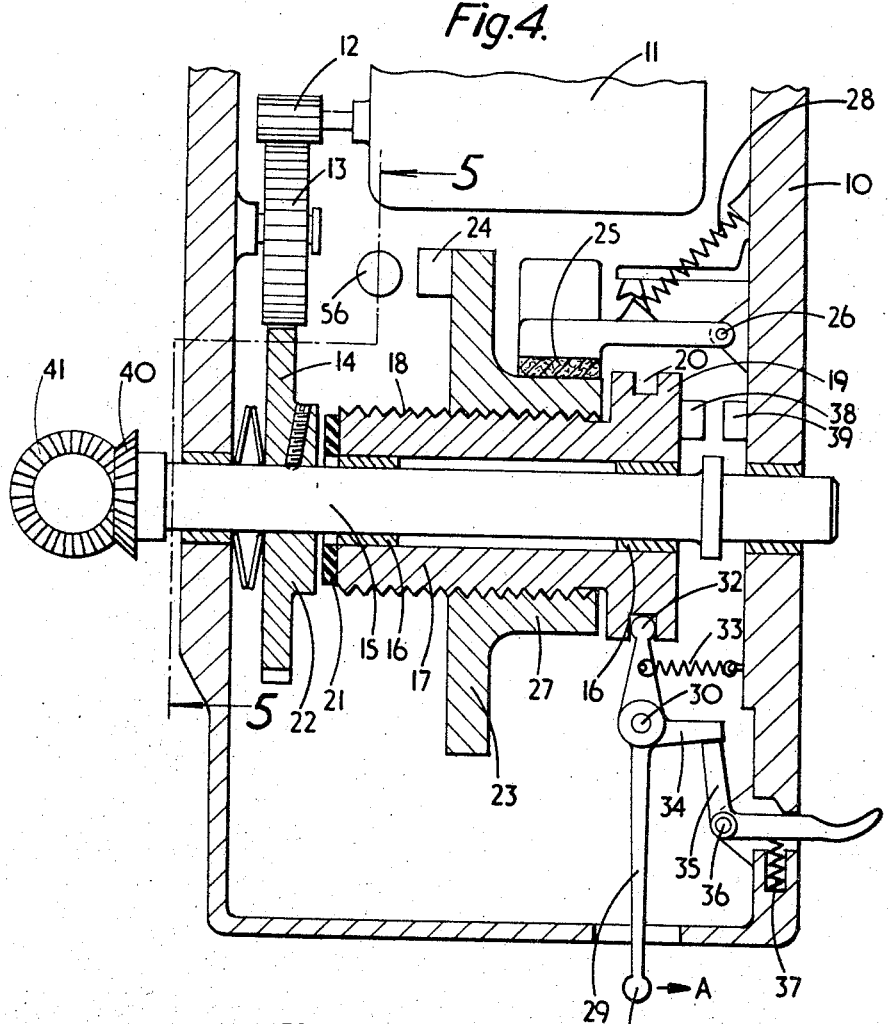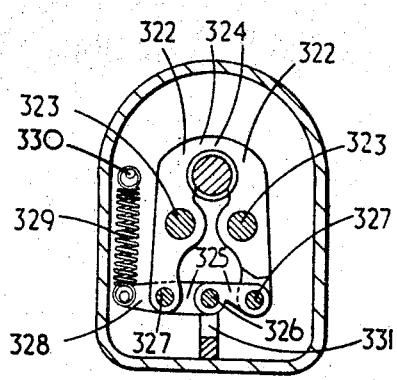

United States Patent Office 3,349,651
Patented Oct. 31, 1967

3,349,651
TOOL FOR PIERCING AND THREADING A WORKPIECE
John H. Turnbull, Kings Heath, Birmingham, and Alexander B. Watt, Handsworth, Birmingham, England, assignors to G.K.N. Screws & Fasteners Limited, Birmingham, England, a British company
Filed Sept. 20, 1965, Ser. No. 488,325
Claims priority, application Great Britain, Sept. 10, 1965, 38,712/65
11 Claims. (Cl. 81—52.3)

This invention relates to a tool for piercing and threading a workpiece, specifically a tool for driving self-tapping screws into a workpiece and more particularly a workpiece comprising, or including, sheet metal.

Hitherto, the general practice when using self-tapping screws in sheet metal, has been to provide a pilot hole for each screw, by means of a separate drilling or punching operation prior to the application of the screw.

In an endeavor to eliminate this separate operation of providing the pilot hole, there have been proposed some forms of self-tapping screw having a drill point such that the point of the screw will drill the required pilot hole to be followed by the actual driving in of the screw in one operation, but the provision of such special drill point makes these self-tapping screws more expensive to manufacture than ordinary self-tapping screws and, in practice, there is the disadvantage that the drilling of the pilot hole by the point of the screw requires a much higher rotational speed than is normally required for the actual driving of the screw into the pilot hole for the screw to produce its own thread in the sheet metal. Consequently, when these particular screws having drill points are used with power-operated tools, the high rotational speed required for the initial drilling of the pilot hole is frequently too high for the subsequent threading operation and may result in stripping of the thread produced by the screw in the sheet metal.

The primary object of the present invention is to provide an electrically operated tool for driving self-tapping screws which will eliminate the necessity for any initial separate operation of providing a punched or drilled pilot hole, by causing the screw to pierce its own hole in the workpiece and subsequently rotate the screw to drive it into the workpiece.

A further object of the invention is to provide such an electrically operated tool having a rotatable screwdriver bit for driving the screw, such bit being also capable of moving axially to project the screw axially and cause its point to pierce the workpiece.

A further object of the invention is to provide an electric power-operated tool for driving self-tapping screws into a workpiece and having a screwdriver bit with electric power means for rotating the bit to drive a screw into a workpiece and electrically operated means for delivering an impact to the bit in the axial direction to cause the point of the screw to pierce a pilot hole in the workpiece.

The invention is illustrated in the accompanying drawings wherein:

FIGURE 2 is a section on the line 2—2 in FIGURE 1.

FIGURE 3 is a section similar to FIGURE 2, but showing the position of the parts during the impact stage.

FIGURE 4 is a fragmentary diagrammatic view showing an alternative form of tool.

Figure 1:
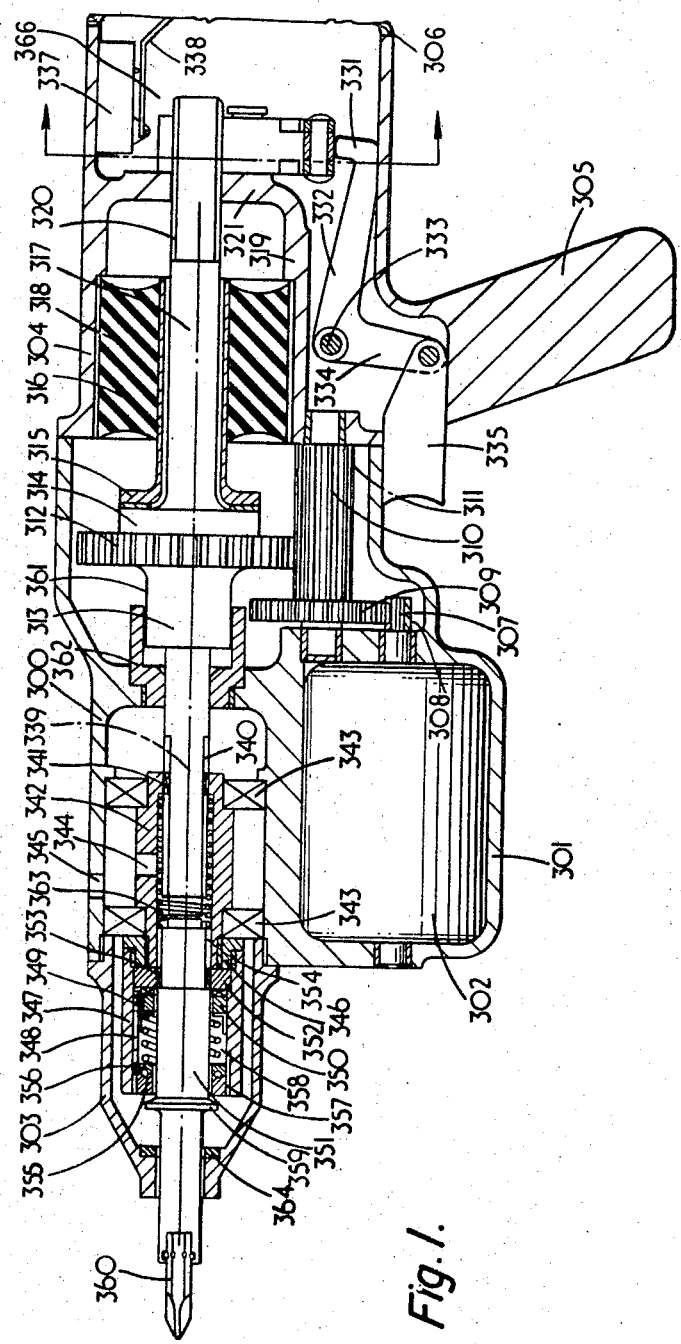
FIGURE 1 is a sectional side elevation of an electrically operated tool.

The tool shown in FIGURES 1, 2 and 3 is in the form of a hand-operated gun which is driven solely by electrical power and which includes an electric motor adapted to transmit the rotary motion to the screwdriver bit and also adapted to store up energy in an energy-storage device, which energy is subsequently released to apply the impact to the impact member for driving the screwdriver bit forwardly. In the first example described hereinafter this energy-storage device takes the form of a mass of rubber which is deformed in shear to store the energy. It will be appreciated, of course, that a spring or number of springs may be employed, or some equivalent form of energy-storage device, such as a pack of resilient washers or a fly-wheel arrangement as described in the second example.

The gun shown in FIGURES 1, 2 and 3 comprises a central body part 300 having on its underside a housing 301 in which is located the electric motor 302, and having at its forward end a further cylindrical housing 303 in which the screwdriver bit operates. At the rear the gun comprises a further body part 304, on the underside of which is a handle 305 and which is closed by an end cap 306.

In operation the gun would be held with both hands, one on the handle 305 and the other hand supporting the gun from below by holding the housing 301, and at some convenient position on the housing 301 there is an electric switch which can be operated by the hand grasping the housing and which controls starting and stopping of the electric motor 302. Such switch is not shown in the drawings, but it will be understood that it will be situated at a convenient position for operation and is of known form.

The driving shaft 307 of the electric motor has a pinion 308 thereon which meshes with a gear wheel 309 on a lay shaft 310 mounted in suitable bearings in the body of the gun and such lay shaft having longitudinally extending teeth 311 in constant rotary and sliding mesh with a gear wheel 312 formed upon the axially slidable impact member 313.

On the rear face of gear wheel 312 the impact member has a flange 314 and the rear face of this flange is in rotary bearing engagement with a flange 315 on the forward end of a metal sleeve 316 which is concentrically located about the shaft 317 tending rearwardly and constituting the rearwards parts of the impact member 313.

A mass of rubber in the form of a sleeve 318 is disposed between the sleeve 316 and the interior of the cylindrical linear 319 rigidly fitted in this part of the body, the external surface of the sleeve being bonded to the interior of liner 319 and the internal surface of the sleeve being bonded to the exterior of the sleeve 316.

At its rear end the shaft 317 has formed thereon an external thread 320 and this threaded end of the impact member passes slidably through the end wall 321 of the housing 319 and, to the rear thereof, is adapted to be engaged by a two part nut member mounted upon the end wall 321.

Such nut member is best shown in FIGURES 2 and 3 and it comprises a pair of similarly shaped levers 322 each of which is pivotally mounted at 323 upon the end wall 321 and each of which has its one end 324 formed to part-circular shape and provided with an internal thread corresponding to the thread 320 on the impact member, so that when the two levers are in the closed position, shown in FIGURE 2, the two ends 324 are in closed engagement about the threaded end of shaft 317 and constitute a nut having threaded engagement with said shaft. In the position indicated in FIGURE 3, the two halves of such nut have moved apart and are no longer in engagement with the thread 320 on shaft 317.

At the other pair of ends the two levers 322 are pivotally connected together by a toggle linkage consisting of two toggle links 325, the centre of the toggle being the pivot pin 326 and the links 325 being pivoted on the levers 322 by pivots 327. One of the links 325 has an extension 328 projecting laterally beyond the associated lever 322 and the one end of a spring 329 is connected to the outer end of the extension 328, the other end of the spring 329 being connected to pin 330 fixed in the end wall 321 of the body part 304. As will be observed from FIGURE 2, the spring 329 normally acts to hold the levers 322 in the closed position in which they are held locked by the action of the toggle linkage 325. Such toggle is broken by the upwards movement of the nose 331 and the levers 322 pivot into the open position against the action of spring 329 as shown in FIGURE 3.

The nose 331 is provided at the end of the one arm 332 of a bell crank lever pivoted at 333 in the body of the gun and having its other arm 334 pivotally connected to a trigger 335 slidable in a recess in the handle 305. It will be observed from FIGURE 1, that pressure exerted on the trigger 335 has the effect of causing the nose 331 to move upwardly thereby breaking toggle linkage 325 and moving levers 322 into the open position.

In the rear end of the body of the gun, in the compartment 336 closed by end cap 306, there is mounted a micro-switch 337 having an operating member 338 the free end of which is positioned so as to be engaged by the rear end of shaft 317 when this is moved inwardly in the manner hereinafter described. When operating member 338 is actuated it operates the micro-switch to break the electric circuit to the driving motor 302 and bring the motor to rest. The micro-switch 337 is a generally known form of trip switch.

At its forward end the impact member 313 has a shaft 339 which extends axially within the body and has external splines 340 which mesh with internal teeth 341 in a sleeve 342 which is rotatably mounted within the body in suitable anti-friction bearings 343. The sleeve 342 has a vent hole 344 and a similar vent hole 345 is provided in the body of the gun so that when the impact member is driven forwardly any air trapped within the sleeve 342 can escape through these vent holes and thus the forward movement of the impact member will not be retarded by such trapped air being compressed.

At this forward end the sleeve 342 has secured thereto a collar 346 which is secured to the rear end of a further sleeve 347 having internal grooves 348 which accommodate balls 349 also accommodated in external grooves in the ring 350 mounted upon the screwdriver bit 351. The ring 350 constitutes one plate of an overload slipping clutch the other plate of which is the ring 352, there being the usual form of teeth on the opposed faces of the two rings 350 and 352. The ring 352 has internal teeth 353 which are in rotary and sliding mesh with splines 354 on the rearwards end of the screwdriver bit 351.

The screwdriver bit 351 is rotated in the following fashion. Drive from electric motor 302 is transmitted via gearing 308, 309, 311 and 312 to shaft 339 and from shaft 339 via sleeve 342, sleeve 347 and overload clutch 350, 352 to the screwdriver bit 351.

At the forward end of the sleeve 347 there is a nut 355 threaded into the end of sleeve 347 and this locates a washer 356 which has external teeth meshing with splines 357 on the interior of the sleeve at this end. The clutch spring 358 which acts upon the one plate 350 of the overload clutch has its other end bearing against the said washer 356. The overload clutch is of a type normally encountered in power operated tools to provide a disconnection in the drive to prevent damage being caused in the event of excess torque resistance being encountered.

Contained within the forward end of the housing 303 is a rubber buffer ring 364 which is engaged by a flange 359 on the screwdriver bit to cushion the impact of the screwdriver bit against the body when it is driven forward by the impact member.

The screwdriver bit 351 has a recess in its forward end in which can be detachably mounted the screw engaging bit 360 which is of the generally known cruciform type for engaging a cruciform type recess in the head of a screw provided with a piercing point. Such member 360 is made detachable in order to enable different sizes of bit to be employed.

Also within the body of the gun the impact member 313 has its cylindrical shaped portion 361 slidably engaging in a cup-shaped member 362 fixed within the body. The member 362 serves as an air cylinder forming a dashpot so that the air therein is compressed and acts to cushion the final movement forward of the impact member and this acts as a safety device in the event of the gun being operated when the screwdriver bit is not engaged with a screw and pressed against a workpiece. The air cushion effect prevents damage to the interior of the gun in the event that it is operated inadvertently under such conditions.

The operation of the gun is as follows, assuming that the screwdriver bit member 360 is to be engaged with a screw to be driven into a workpiece.

The operator switches on the electric motor by means of the switch on the housing 301 and at this time the two part nut member 324 is in the closed condition as shown in FIGURE 2. Thus the rotation of the electric motor causes rotation of the impact member via gear 312 and due to the threaded engagement of the shaft 317 and the nut member 324 the impact member is caused to be moved in the rearwards direction of FIGURE 1. This axial movement is transmitted to sleeve 316 causing the body of rubber 318 to be distorted in the axial direction in shear thus storing up energy in the rubber member 318 which is in effect, therefore, an energy-storage device.

The rearwards movement of the shaft 317 continues so long as the electric motor is kept running and until the rear end of shaft 317 engages the actuating member 338 and trips the micro-switch 337, interrupting the electric supply to the motor and thus stopping the drive. The gun is then in a cocked condition with the impact member held in this rear position by virtue of the closed condition of the nut 324, the rubber body 318 being in its maximum deformed state.

The operator then positions the gun, with the screw engaged on the member 360, in the desired position in relation to the workpiece and then presses the trigger 335 to open the nut member 324, as hereinbefore described, thus releasing the shaft 317. In returning to its initial undeformed state, the rubber body 318 drives the impact member 313 forwardly to deliver an impact on the rear end of the screwdriver bit 351, causing the screw engaged thereon to pierce the workpiece. Simultaneously, immediately the end of shaft 317 comes out of engagement with actuating member 338 the micro-switch 337 is reactuated to close the circuit to the electric motor, which thus again commences to drive and, as above described, transmits rotary motion to the screwdriver bit 351 resulting in the screw being driven into the workpiece.

After the screw has been driven fully home the gun is withdrawn so as to disengage the member 360 from the head of the screw and at this stage the electric motor may be switched off by operating the switch on the housing 301. When the pressure is released from trigger 335 the two part nut member 324 will close in to the shaft 317 and the gun can then be cocked again for further use by switching on the electric motor and the above sequence of operations repeated.

A coil spring 363 located within the sleeve 342 acts upon the rear end of the screwdriver bit 351 and serves to normally hold this in a forward position in which it is out of contact with the forward end of the impact member 339. When the operator engages the screw against the workpiece and applies light pressure the spring 363 is compressed to move the screwdriver bit rearwardly to the operative positions in which it is ready to receive the impact from impact member 13. This spring 363 is a further safety device to ensure that if the impact member is inadvertently operated when the gun is not pressed against the workpiece, the impact member will not be able to engage the screwdriver bit 351.

Figure 5:
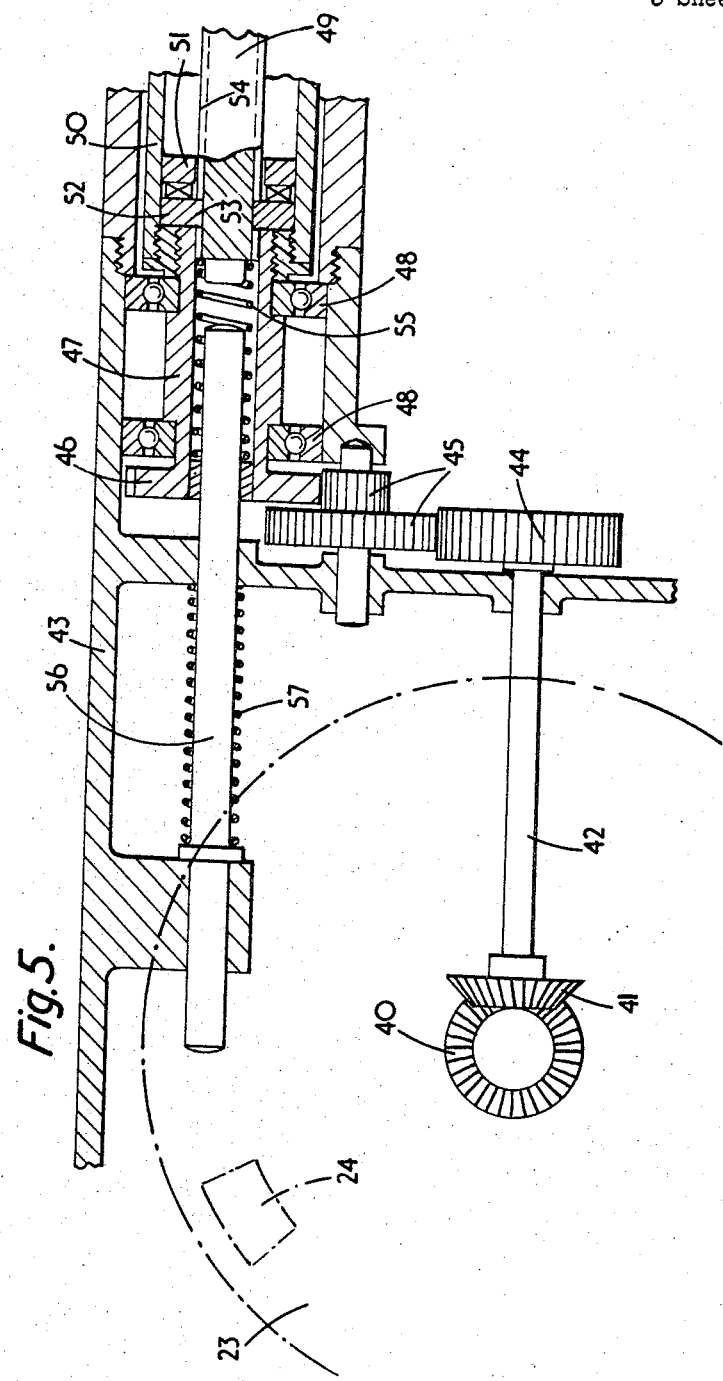
FIGURE 5 is a diagrammatic section on line 5—5 in FIGURE 4.

Referring now to FIGURES 4 and 5, these are purely diagrammatic drawings to show, with the aid of the following brief description, an alternative form of energy-storage device adapted to provide the impact in a gun which is wholly operated by electric power.

In FIGURE 4 the outer wall 10 represents the outer part of the body towards the rear of the gun, and within this part there is mounted an electric motor 11 having a driving pinion 12 which drives through an idle gear 13 a gear 14 fixed upon a shaft 15 rotatably mounted in suitable bearings in the part 10 of the body. Mounted slidably and rotatably upon the shaft 15 on suitable bearings 16 is a sleeve 17 which is provided with an external right hand thread 18 over the major part of its length, and at its one end is formed with a flange 19 having therein a peripheral groove 20.

At the other end of the sleeve 17 there is provided a disc of frictional material 21 which forms the one plate of a clutch and the face of a boss 22 on the gear wheel 14 forms the other plate of such clutch so that when the two parts 21 and 22 are in engagement the sleeve 17 is rotated by the gear wheel 14.

Mounted upon the outside of the sleeve 17 is a flywheel 23 having an external thread cooperating with the thread 18 on the sleeve and being provided with a hammer 24 fixed to its one face adjacent the periphery, such hammer 24 being adapted to deliver an impact in the manner hereinafter described.

A brake member 25 pivoted to the body 10 at 26 presses lightly upon the exterior of a boss 27 formed integrally with the flywheel 23, such member being urged by a spring 28.

There is also provided a setting lever and trigger mechanism indicated diagrammatically in FIGURE 4, the setting lever comprising lever 29 pivoted in the body at 30 and having one end 31 projecting outside the body in the position for operation by the hand and the opposite end 32 engaging in the peripheral groove 20 on the sleeve member 17. A spring 33 normally urges the lever 29 in the clockwise direction, as seen in FIGURE 4, in which its end 32 holds the clutch plate 21 out of engagement with clutch plate 22. Formed integrally with the setting lever 29 is an arm 34 which is engaged by the trigger 35 pivoted at 36 in the body and acted upon by a spring 37.

From the following description it will be appreciated that in FIGURE 4 the parts are shown in the state in which the clutch plates 21 and 22 are actually in engagement, although for the purpose of clarity clearance is shown in the drawings.

The end face of sleeve 17 adjacent the flange 19 is provided with an outwardly projecting dog 38 and in an axially aligned position there is provided a fixed dog 39 on the interior of the wall 10.

Referring now to FIGURE 5, a bevel gear 40 fixed on one end of shaft 17 meshes with the bevel gear 41 and an intermediate shaft 42 rotatably mounted in a further part of the body indicated at 43 in FIGURE 5, and at its other end the shaft 42 has a gear wheel 44 driving an intermediate cluster gear 45 which drives a gear wheel 46 formed on the end of the rotatable sleeve 47 which is mounted in the body part 43 of a suitable bearing 48. This sleeve 47 transmits rotation to the screwdriver bit 49 in the same manner as illustrated for the previously described constructions of FIGURES 1 to 3. Briefly, the sleeve 47 has secured to its one end a further sleeve 50 having secured therein the part 51 of the overload clutch, the other part 52 of which has internal teeth 53 engaging splines 54 on the screwdriver bit 49, and there is provided the spring 55 within the sleeve 47 acting upon the screwdriver bit 49 to normally maintain it forwardly, with its rear end away from the sliding impact member 56.

This impact member 56 comprises a shaft slidably mounted in the body part 43 and normally held in the retracted position by a spring 57.

In operation the electric motor rotates gear wheel 14, and when it is desired to use the gun the setting lever 29 is moved anti-clockwise in the direction of the arrow A in FIGURE 4 so as to move the sleeve 17 to the left and engage the clutch plates 21, 22 so that the sleeve 17 is rotated. Due to the threaded engagement between the flywheel 23 and the sleeve 17 such rotation causes the flywheel to move axially to the right to the maximum extent, this being assisted by the braking force exerted by the brake member 25. Once the setting lever 29 has been moved into this position it is held therein by the trigger 35 until such times as it is desired to deliver the impact to the screwdriver bit. The trigger 35 is then operated so as to pivot in the clockwise direction in FIGURE 4, thus releasing the arm 34 of the setting lever and allowing the spring 33 to act to move the setting lever in the clockwise direction and thus move the sleeve 17 to the right in FIGURE 4, which immediately disengages the clutch plates 21 and 22 and releases the drive to the sleeve 17. At the same time the dog 38 on the end of sleeve 17 engages the fixed dog 39 and the sleeve 17 is brought immediately to rest.

The flywheel 23 however continuing to rotate at high speed and by virtue of the threaded engagement with the sleeve 17 moves axially from right to left in FIGURE 4, and after approximately one complete revolution the hammer 24 on the flywheel comes into alignment with the impact member shaft 56 and delivers the impact to this shaft to cause it to move axially and impact against the end of the screwdriver bit 49. The distance between the centres of the hammer 24 and shaft 26 is equal approximately to the pitch of the thread 18 so that after approximately one revolution at high speed the flywheel 23 will have moved axially the distance required to bring the hammer 24 into alignment with the impact member 56 to deliver the impact.

What we claim then is:

1. A tool for applying self-tapping screws to a workpiece, comprising a body, a screw-driver bit rotatably and slidably mounted in said body, an electric motor within the body for rotating said bit, an impact member slidably mounted within said body, and means operated by said electric motor for driving said impact member into engagement with said screw-driver bit to deliver an impact causing the screw-driver bit to slide in the body.

2. A tool for applying self-tapping screws to a workpiece, comprising a body, a screw-driver bit rotatably and slidably mounted in said body, an electric motor within the body for rotating said bit, an energy-storage device within said body, means operated by said electric motor for energizing said device and means for releasing the stored energy in the form of an impact delivered to said screw-driver bit causing it to slide in the body.

3. A tool for applying self-tapping screws to a workpiece, comprising a body, a screw-driver bit rotatably and slidably mounted in said body, an electric motor within the body for rotating said bit, an impact member slidably mounted within said body, a resiliently deformable energy-storage device within said body, means operated by said electric motor for deforming said device to store energy and means for releasing said device from its deformed state for it to drive said impact member into engagement with said screw-driver bit to deliver an impact causing the screw-driver bit to slide in the body.

4. A tool according to claim 3, wherein said impact member comprises a shaft slidable axially within the body, said energy-storage device comprises a sleeve of rubber disposed concentrically about said shaft, the outer surface of the rubber sleeve being secured to said body, the inner surface of the rubber sleeve being secured to a metal sleeve freely mounted co-axially about said shaft and having a flange engaging a flange on said shaft, there being gearing between said electric motor and said shaft for rotating same and there being means for translating rotary motion of said shaft into axial motion thereof to displace said metal sleeve axially and deform said rubber sleeve.

5. A tool according to claim 3, wherein said energy-storage device comprises a deformable spring device fixed in the body, said impact member comprises a shaft rotatable and axially slidable within the body, axial movement of said shaft in one direction serving to deform said spring device, there being gearing between said electric motor and said shaft for rotating the shaft and nut means mounted in the body and engageable with a screwed part of said shaft to translate rotation of said shaft into axial movement thereof in said one direction.

6. A tool according to claim 5, wherein said nut means comprises a pair of levers pivoted in said body on spaced parallel axes and having one pair of ends formed as the two halves of a two-part nut, the levers being connected by a spring-stressed toggle linkage acting to hold the levers in the position in which the two nut parts have threaded engagement with a screwed portion of the said shaft forming the impact member, there being a trigger mechanism operable to break the toggle linkage and hold the two nut parts out of engagement with the said shaft.

7. A tool according to claim 5, wherein a micro-switch is incorporated in the body of the gun and controlling the power supply to said electric motor, the said shaft being adapted to actuate the micro-switch after moving a predetermined axial distance in said one direction to break the power supply to the electric motor.

8. A tool according to claim 5, wherein the rotary drive to the screw-driver bit is transmitted from said shaft forming the impact member through disengageable clutch means, the screw-driver bit being in axial alignment with said shaft and there being a sleeve slidably and non-rotatably keyed to the shaft, which sleeve transmits rotation to the screw-driver bit via said clutch means.

9. A tool for applying self-tapping screws to a workpiece, comprising a body, a screwdriver bit rotatably and slidably mounted in said body, an electric motor within the body for rotating said bit, an impact member slidably mounted within said body, an energy-storage device in the form of a rotatable flywheel within said body, a hammer member carried by said flywheel, means operated by said electric motor for rotating said flywheel to cause the hammer member thereon to drive said impact member into engagement with said screwdriver bit to deliver an impact causing the screwdriver bit to slide in the body.

10. A tool according to claim 9, wherein the means for rotating the flywheel comprises a shaft rotatably mounted in the body, a sleeve slidably and rotatably mounted on said shaft, gearing between said shaft and the electric motor, clutch means for clutching said shaft into driving engagement with said sleeve operable by axial sliding movement of said sleeve upon said shaft, the flywheel being mounted upon the exterior of said sleeve and having an internal screwthread cooperating with an external screwthread on the exterior of said sleeve, there being means to instantaneously arrest rotation of said sleeve causing the flywheel to move axially along the sleeve by virtue of the screwthreaded connection between the two.

11. A tool according to claim 10, including a setting lever pivotally mounted in the body and operable to move said sleeve axially in the direction to engage said clutch means against the action of return spring means, and a trigger member acting on said setting lever to hold it in the position of engagement of said clutch means and being disengageable from said setting lever to permit the return spring means to disengage said clutch means.

References Cited
UNITED STATES PATENTS

| | | | |
|---|---|---|---|
| 3,000,225 | 9/1961 | Taylor | 173—48 X |
| 3,161,241 | 12/1964 | Allen et al. | 173—47 |
| 3,171,286 | 3/1965 | Stewart | 173—48 X |

JAMES L. JONES, Jr., *Primary Examiner.*